W. W. BYAM.
WHEEL.
APPLICATION FILED MAY 24, 1910.

1,013,273.

Patented Jan. 2, 1912.
3 SHEETS—SHEET 1.

Witnesses:
John Enders
Edythe M. Anderson

Inventor:
William W. Byam,
by Sheridan, Wilkinson, Scott & Richmond
Attys

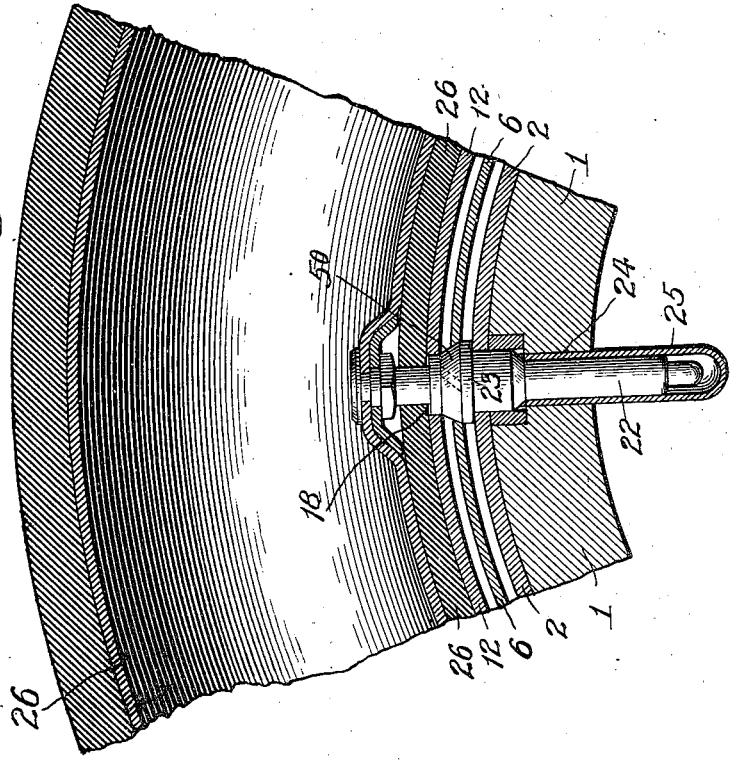
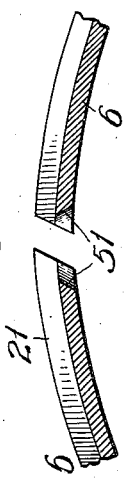
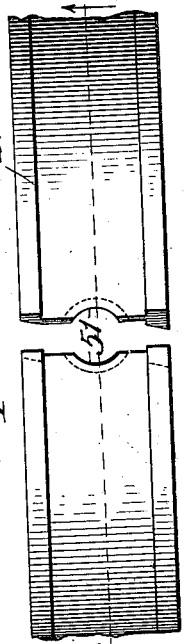
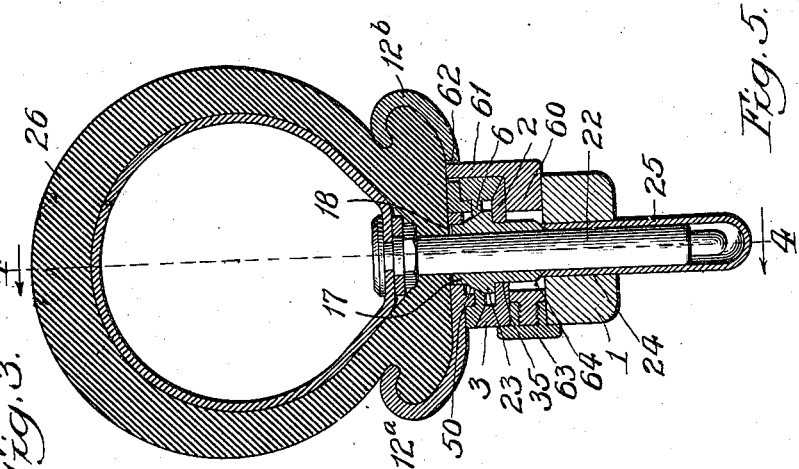

W. W. BYAM.
WHEEL.
APPLICATION FILED MAY 24, 1910.
1,013,273.
Patented Jan. 2, 1912.
3 SHEETS—SHEET 3.
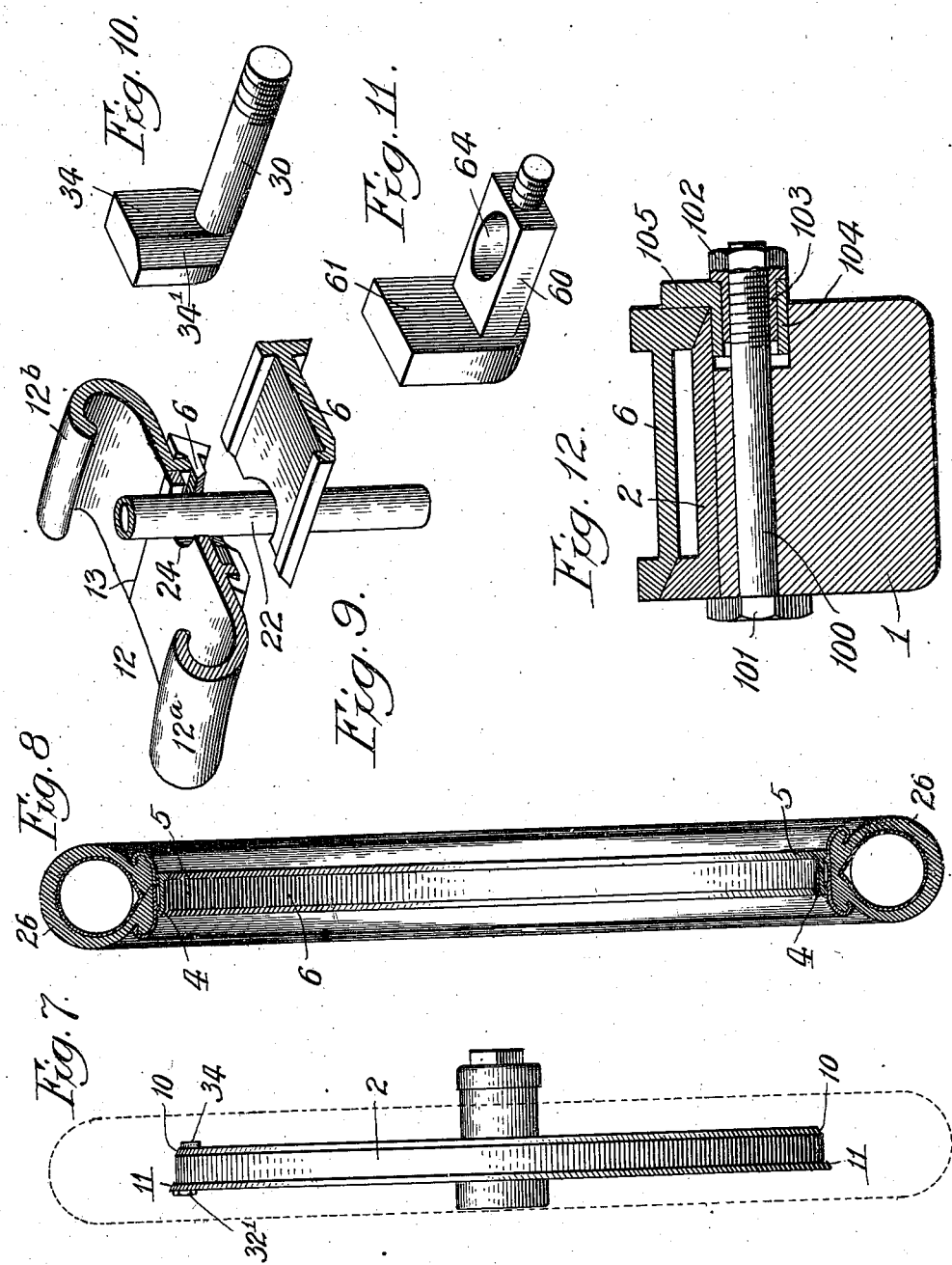
Witnesses:
John Enders
Edythe M. Anderson
Inventor:
William W. Byam,
by Sheridan, Wilkinson, Scott & Richmond,
Attys.

UNITED STATES PATENT OFFICE.

WILLIAM W. BYAM, OF CHICAGO, ILLINOIS.

WHEEL.

1,013,273.

Specification of Letters Patent. Patented Jan. 2, 1912.

Application filed May 24, 1910. Serial No. 563,132.

*To all whom it may concern:*

Be it known that I, WILLIAM W. BYAM, a citizen of the United States, residing at Chicago, in the county of Cook and State of Illinois, have invented certain new and useful Improvements in Wheels, of which the following is a specification.

The object of my invention is to provide convenient and efficient means for mounting a tire rim upon a wheel and for securing together the separable sections of the rim.

As will appear from the following description, my improved device may be used for holding a rim upon a wheel where the rim is constructed in separable sections for the purpose of facilitating the removal of a tire therefrom, or is constructed integrally. When the rim is constructed of separable sections, however, the same fastening device serves to hold the sections together and to hold the entire rim upon the wheel. In some respects the mechanism disclosed herein is similar to that upon which my application for patent Serial No. 513,310, filed August 17, 1909 and application Serial No. 557,367, filed April 25, 1910 are based, a channel locking ring forming part of the structure disclosed in my present and former applications, such locking ring coacting in a similar manner in both cases with the rim. In the present application, however, I disclose and claim a different mode of forcing the locking ring outwardly into engagement with the rim and also certain other improvements.

The precise nature and object of my invention will clearly appear from the following description and claims, taken in connection with the accompanying drawings, in which—

Figure 1:
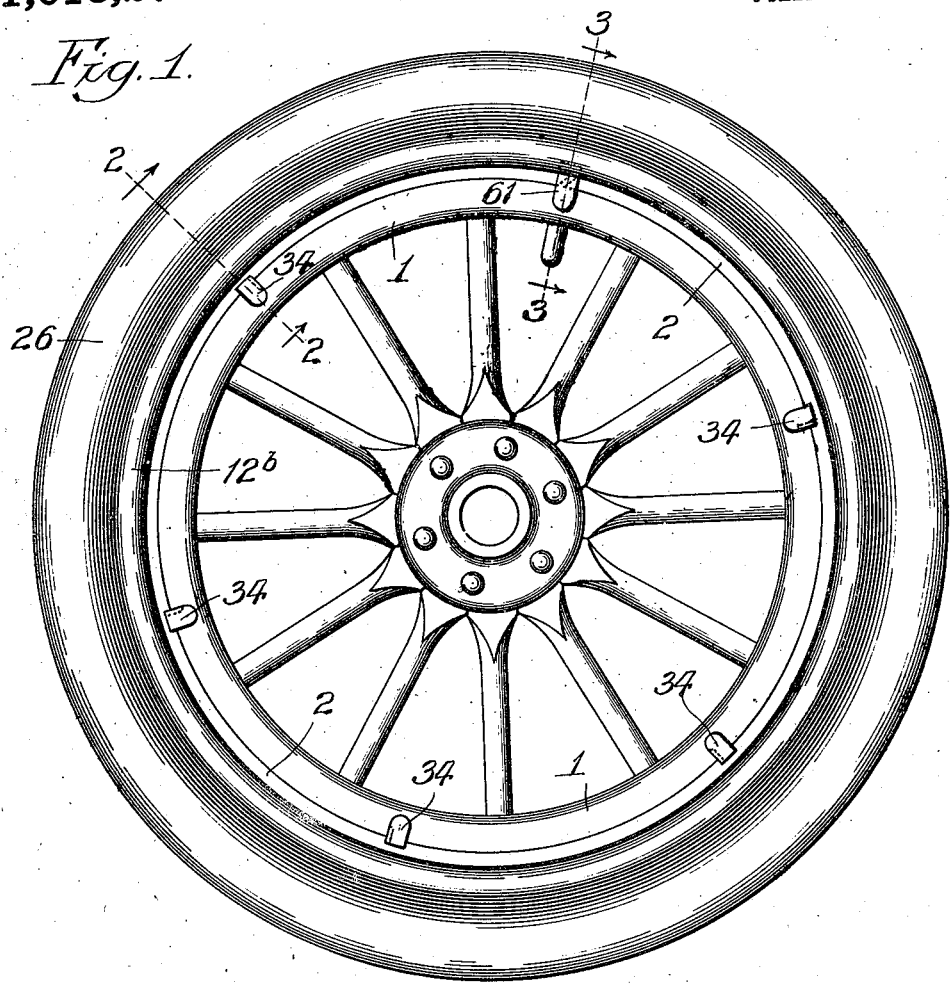
Figure 2:
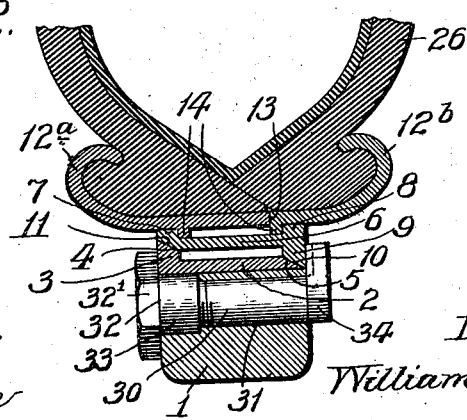

Figure 1 is a side view of a wheel equipped with my invention. Fig. 2 is a cross sectional view through the outer part of the wheel upon the line 2, 2 of Fig. 1. Fig. 3 is a cross sectional view on the line 3, 3 of Fig. 1. Fig. 4 is a section in the plane of the wheel on the line 4, 4 of Fig. 3. Fig. 5 is a fragmentary view showing the ends of the locking ring. Fig. 6 is a sectional view of the structure shown in Fig. 5, the section being taken on the line 6—6. Fig. 7 is an edge view of the interior part of the wheel, the locking ring, rim and tire being omitted, and the outline of the tire being shown in dotted lines. Fig. 8 is a detail section through the assembled locking ring, rim and tire, the section being taken at right angles to the plane of the wheel. Fig. 9 is a fragmentary view showing the manner of springing the locking ring into or out of the rim. Fig. 10 is a perspective view of one of the clamping bolts. Fig. 11 is a perspective view of a fixed clamping bolt and dowel. Fig. 12 is a sectional view similar to Fig. 2 showing a modified form of fastening bolt.

Generally stated, my invention comprises a wheel provided with a conical surface inclining in a direction transverse to the plane of the wheel; said conical surface preferably being formed on a band shrunk or otherwise secured on the felly, a rim having inwardly extending projections; a channel lock-ring having flanges upon the outside engaging the projections upon the rim and upon the inside a conical surface adapted to coact with the conical surface upon the band which is shrunk upon the felly; and means, in the specific form illustrated taking the form of bolts, for forcing the lock-ring over the band whereby the coacting conical surfaces force the ring outwardly into binding engagement with the rim.

Upon the felly 1 of the wheel a band 2 is shrunk or otherwise secured. The band 2 is provided at one edge with an outwardly extending flange 3, the edge of which flange is beveled as indicated at 4 to form a conical surface. The opposite edge of the ring 2 is beveled at 5 to form a similar conical surface.

The channel locking ring 6 is provided with outwardly extending flanges 7 and 8, and upon one edge the lock-ring has an inwardly extending flange 9 provided with a conical surface 10 adapted to coact with the conical surface 5 upon the band 2. At the opposite edge the interior of the lock ring, as indicated at 11, has a conical surface which is adapted to coact with the conical surface 4 upon the band 2.

The rim, designated generally by the numeral 12, comprises two annular sections 12ᵃ and 12ᵇ divided upon a circumferential line 13 shown in the present instance as located at one side of the center. Each of the sections 12ᵃ and 12ᵇ is provided with an inwardly extending projection 14. While the projections 14 are illustrated as taking the form of continuous flanges extending around the circumference of the wheel, it will of course be obvious that they need not necessarily be continuous. The projections 14, 14 are so spaced as to be received snugly between the outwardly projecting flanges 7 and 8 upon the lock ring 6.

The lock ring 6 is not continuous, but is divided transversely as indicated in Figs. 1, 4, 5, 6 and 9, the ends of the lock ring being beveled. The length of the lock ring is such that in the assembled structure its ends are spaced apart about half an inch, although, of course, the precise dimensions are not essential to the principle of my invention. The ends of the lock ring are notched as clearly shown in Figs. 4, 5, 6 and 9, these notches being designated by the numeral 51, and serving to permit the ends of the lock ring to abut against a nut 18 threaded upon the valve stem. The rim 12 is provided with an aperture 17 somewhat larger than the valve stem and is of such a size as to fit closely about the upper cylindrical end of the nut 18. The nut 18 is provided intermediate of its ends with a projecting shoulder 23, which is tapered upwardly as indicated at 50 to coact with the notches 51 which are correspondingly tapered as indicated in Figs. 5 and 6. The felly 1 is provided with an aperture 24 through which the valve stem may project, said aperture being of sufficient size to receive the cap 25 of the valve.

In assembling the lock ring, rim and tire the part 12ᵃ of the rim may be laid upon the floor and the flange of the tire casing 26 inserted therein with the valve stem 22 projecting through the opening 17, the cap 25 and nut 18 being removed at this time. The part 12ᵇ of the rim is then placed in position over the other flange of the tire casing 26. One end of the lock ring 6 is then sprung inwardly as indicated in Fig. 9, this being the undercut end, as clearly shown in Figs. 6 and 9. The lock ring is then placed inside of the rim with one end of the lock ring lying against the rim and the notch 51 therein embracing the valve stem, and the other end of the lock ring, which at the time is bent inwardly is so adjusted that the notch 51 therein is opposite the valve stem and is then allowed to spring outwardly into contact with the rim. The relations of the parts in inserting the lock ring inside of the rim or removing it therefrom is clearly illustrated in Fig. 9, in which figure one end of the lock ring is shown as sprung inwardly and the valve stem 22 passing through the notch 51. When the ends of the lock ring are in engagement with the rim the notches 51 leave sufficient space around the valve stem for the reception of the nut 18. This nut is then screwed inwardly over the valve stem, its tapered part 50 passing between the correspondingly tapered notches 51 in the lock ring and the outer end of the nut passes through the aperture 17 in the rim section 12ᵃ. The nut 18 is screwed upon the valve stem until its tapered part 50 has forced the ends of the lock ring apart, thus expanding the lock ring into close engagement with the interior of the rim, thus securely holding the lock ring in engagement with the rim and thereby securely holding the two sections of the rim together by reason of the engagement of the flanges 7 and 8 with the outer surfaces of the projections 14. The valve cap 25 may then be screwed into position. As thus assembled the parts are secured together sufficiently to be carried on an automobile as an extra rim and tire.

When assembled as above described, the parts occupy the positions shown in Figs. 3, 4 and 8. In Figs. 3 and 4, however, the interior fixed part of the wheel including the felly 1 and band 2 together with a holding bolt are also shown. Omitting the parts last named Figs. 3 and 4 illustrate the tire, rim and lock ring as assembled for the purpose of being carried as a spare rim and tire to be mounted upon a wheel in case of necessity.

In mounting the device so assembled upon a wheel, the valve stem with the nut 18 and cap 25 thereon are inserted through the opening 24 in the felly and the lock ring and rim moved into position over the band 2, thus bringing the conical surfaces 10 and 11 upon the lock ring into engagement with the conical surfaces 4 and 5 upon the band 2. The lock ring is then firmly forced into engagement with the band 2 by means of bolts 30 shown in detail in Figs. 2 and 10 mounted in transverse apertures 31 in the felly 1 and provided with heads 34 and nuts 32. Ordinarily five of these bolts will be found sufficient. Each of the bolts 30 is provided with a head 34 formed eccentrically of the bolt and adapted to overlie the side of the ring 6, as clearly shown in Figs. 1 and 2. The nuts 32 of the bolts 30 are provided with polygonal or non-circular heads 34 from which an interiorly threaded sleeve 33 projects inwardly. When the bolts 30 are turned so that their eccentric heads 34 project outwardly from the center of the wheel they overlie the ring 6, as shown in Fig. 2, but when turned 180° from that position the nuts lie entirely inside of the ring 6, thus permitting the ring to be slipped on or off of the wheel. The heads 34 of the bolts 30 may be beveled upon one side as indicated at 34' in Fig. 10 so that when the bolts are turned their heads will easily pass the edge of the lock ring 6. After the ring 6 with the rim and tire is slipped into position over the wheel, the bolts 30 are turned inwardly in the nuts 32, thus securely seating the conical surfaces 10 and 11 of the ring 6 upon the coacting conical surfaces 4 and 5 of the band 2. I have found that by properly proportioning the parts and by properly adjusting the screw thread upon the bolts 30, the locking ring 6 may be forced inward over the band 2 to the proper extent at the time the eccentric heads of the bolts 30 project outwardly from the center of the wheel. In fact after placing the locking ring with the rim and tire over the wheel a single half turn of the bolts 30 will generally be sufficient to lock the parts together.

When the rim and tire are mounted upon the wheel as above described, the lock nut 18 serves to secure the part 12ª of the rim against rotary movement upon the inner part of the wheel by reason of the fact that the outer end of the lock nut snugly engages the aperture 17, the notches in the ends of the lock ring 6 and the aperture 35 on the band 2, and the outward expansion of the lock ring 6 due to its having been forced over the band 2 causes it to firmly engage the rim, thus securely holding the separable parts of the rim together and at the same time holding the rim securely to the interior of the wheel.

Where the valve stem passes through the felly I employ a permanent fastening device corresponding generally in form to the bolts 30 and their nuts 32. This fastening device comprises a bolt 60, shown in Figs. 3 and 11, having a head 61 which engages an aperture 62 in the rim section 12ᵇ. The bolt 60 is held in place in the aperture in the felly 1 by means of a nut 63. The bolt 60 forms a permanent part of the interior of the wheel and is designed to always occupy the position shown in Fig. 3, the bolt 60 being permanently assembled with the felly. The bolt 60 is provided with an aperture 64 registering with the opening 24 in the felly. After the tire, rim and lock ring are assembled in the manner above described and it is desired to place these parts upon a wheel, the old rim with its lock ring is removed and the wheel turned to bring the valve stem opening 24 to the top. Thereupon the new tire with its rim and lock ring is lifted into position slightly above the wheel and the valve stem permitted to drop through the opening provided for it in the felly, and the opening 62 in the rim section 12ᵇ to pass over the head 61 of the bolt 60. The head 61 of the bolt 60 constitutes a dowel, preventing relative rotation of the rim section 12ᵇ and the interior part of the wheel.

From the foregoing it will be apparent that the lock nut 18 not only serves to securely hold the lock ring and separable sections of the rim together when carried as a spare rim and tire, but also serves when the device is mounted upon a wheel to act as a positive preventive of relative rotation of the rim section 12ª and interior part of the wheel, and the head 61 of the bolt 60 prevents relative rotation of the rim section 12ᵇ and the interior part of the wheel. By forming the conical surfaces 4, 5, 10 and 11 of comparatively little width I avoid the difficulty arising from the rusting together of large contacting surfaces. From the drawings it will be apparent that there is no contact between the lock ring 6 and the band 2 except at the edges thereof and the removal of a rim from a wheel is thereby greatly facilitated as it is only necessary to separate the lock ring from the band 2 along these comparatively restricted surfaces.

In Fig. 12 I have illustrated a modified form of bolt for forcing the lock ring over the felly. In this modification I employ a bolt 100 having a non-circular head 101 and extending through an aperture in the felly 1. The bolt is provided with a nut 102 formed integrally with the sleeve 103, the nut with its sleeve being threaded upon the bolt 100. Surrounding the sleeve 103 is a sleeve 104 provided with an eccentric projection or head 105 somewhat similar in form to the heads 34 of the bolts 30. In mounting the spare rim upon a wheel the nuts 102 are screwed inwardly carrying with them the sleeves 104, the head 102 of the nut projecting over the outer face of the head 105 of the sleeve 104. In demounting the rim the nuts 102 are loosened sufficiently to permit the sleeves 103 to be turned a half revolution, thus causing the eccentric head 105 to project inwardly toward the center of the wheel. This permits the lock ring with the rim and tire to be slipped off the wheel in the manner described above.

While I have described a specific embodiment of my invention, it will be apparent that the principle thereof may be applied without adhering to the precise form of lock nut described or to the precise form of bolts for drawing the lock ring into binding contact with the band 2, and that variations in many other of the details described may be made without departing from the spirit of my invention.

I claim:

In a device of the class described, a rim composed of two circumferentially continuous annular sections having inwardly extending projections thereon, a transversely split channel lock ring having outwardly projecting side flanges, said rim sections resting upon the outer edges of said side flanges and being separated from the central part of said lock ring by a clearance space, said projections being received between said side flanges, and means for expanding said lock ring.

In testimony whereof, I have subscribed my name.

WILLIAM W. BYAM.

Witnesses:
 ALICE F. B. SCOTT,
 EDYTHE M. ANDERSON.